United States Patent
Chao et al.

(10) Patent No.: US 10,176,488 B2
(45) Date of Patent: Jan. 8, 2019

(54) PERTURBATION, MONITORING, AND ADJUSTMENT OF AN INCENTIVE AMOUNT USING STATISTICALLY VALUABLE INDIVIDUAL INCENTIVE SENSITIVITY FOR IMPROVING SURVEY PARTICIPATION RATE

(71) Applicant: International Business Machines Corporation, Armonk, NY (US)

(72) Inventors: Tian-Jy Chao, Bedford, NY (US); Younghun Kim, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/184,237

(22) Filed: Feb. 19, 2014

(65) Prior Publication Data

US 2015/0235252 A1   Aug. 20, 2015

(51) Int. Cl.
*G06Q 30/00* (2012.01)
*G06Q 30/02* (2012.01)

(52) U.S. Cl.
CPC ..... *G06Q 30/0211* (2013.01); *G06Q 30/0244* (2013.01); *G06Q 30/0218* (2013.01)

(58) Field of Classification Search
CPC .................. G06C 30/0245; G06Q 30/0211
(Continued)

(56) References Cited

U.S. PATENT DOCUMENTS 7,908,166 B2   3/2011   Keil et al.
8,135,693 B2   3/2012   Brazier et al.
(Continued)

FOREIGN PATENT DOCUMENTS

EP   1877882 A1   1/2008
WO   2006119112 A1   11/2006
(Continued)

OTHER PUBLICATIONS

Gelman, A; Stevens M; Chan, V; Regression Modeling and Meta-Analysis for Decision Making: A Cost-Benefit Analysis of Incentives in Telephone Surveys, Journal of Business & Economic Statistics, 213-225, American Statistical Association, Apr. 2003 (Year: 2003).*

(Continued)

*Primary Examiner* — Matthew L Hamilton
(74) *Attorney, Agent, or Firm* — Scully, Scott, Murphy & Presser, P.C.; JoAnn Crockall

(57) ABSTRACT

Sensitivity to incentive changes of survey participant may be computed and analyzed. Participants and one or more attributes associated with the participants may be identified. The participants may be clustered into one or more clusters according to the one or more attributes. An incentive amount to be given to a participant in a cluster of said one or more clusters may be perturbed by performing random perturbation computation. The incentive may be distributed to the participant. One or more responses of the participant may be monitored. Individual incentive sensitivity representing incentive sensitivity of responsiveness of the participant per incentive change may be computed based on the monitoring. Incentive amount computation may be dynamically adjusted responsive to determining that the individual incentive sensitivity changed by a predefined criterion.

20 Claims, 5 Drawing Sheets

(58) Field of Classification Search
USPC .......................................................... 705/14
See application file for complete search history.

(56) References Cited

U.S. PATENT DOCUMENTS

| | | | |
|---|---|---|---|
| 8,306,937 B2 | 11/2012 | Otto et al. | |
| 8,313,383 B1 | 11/2012 | Bordier | |
| 8,417,558 B2 | 4/2013 | Koonce et al. | |
| 8,635,099 B1* | 1/2014 | Floyd | G06Q 10/10 |
| | | | 705/14.1 |
| 9,264,329 B2 | 2/2016 | Chrapko et al. | |
| 2002/0046096 A1* | 4/2002 | Srinivasan | G06Q 30/02 |
| | | | 705/14.13 |
| 2004/0133463 A1 | 7/2004 | Benderev | |
| 2004/0203989 A1 | 10/2004 | Karaoguz | |
| 2004/0230989 A1 | 11/2004 | Macey et al. | |
| 2006/0031510 A1 | 2/2006 | Beck et al. | |
| 2006/0155513 A1 | 7/2006 | Mizrahi et al. | |
| 2007/0094601 A1 | 4/2007 | Greenberg et al. | |
| 2007/0099162 A1 | 5/2007 | Sekhar | |
| 2008/0189408 A1 | 8/2008 | Cancel et al. | |
| 2009/0106084 A1 | 4/2009 | Or | |
| 2011/0145043 A1 | 6/2011 | Handel | |
| 2011/0191417 A1 | 8/2011 | Rathod | |
| 2011/0251876 A1 | 10/2011 | Fisher | |
| 2012/0109714 A1 | 5/2012 | Azar | |
| 2012/0166253 A1 | 6/2012 | Yerkovich | |
| 2012/0226743 A1 | 9/2012 | Smargon | |
| 2012/0246102 A1 | 9/2012 | Sudharsan | |
| 2012/0316921 A1* | 12/2012 | Carsanaro | G06Q 30/0201 |
| | | | 705/7.32 |
| 2013/0004933 A1* | 1/2013 | Bhaskaran | G09B 7/00 |
| | | | 434/362 |
| 2013/0024263 A1 | 1/2013 | Otto et al. | |
| 2013/0090565 A1 | 4/2013 | Quy | |
| 2013/0111323 A1 | 5/2013 | Taghaddos et al. | |
| 2013/0117040 A1 | 5/2013 | James et al. | |
| 2013/0117043 A1 | 5/2013 | Condon et al. | |
| 2013/0211852 A1 | 8/2013 | Roizen et al. | |
| 2013/0280682 A1 | 10/2013 | Levine et al. | |
| 2013/0298038 A1 | 11/2013 | Spivack et al. | |
| 2014/0100918 A1 | 4/2014 | Rosenberger et al. | |
| 2014/0128691 A1 | 5/2014 | Olivier | |
| 2014/0200908 A1 | 7/2014 | Moore et al. | |
| 2014/0280751 A1 | 9/2014 | Lo | |
| 2014/0358636 A1 | 12/2014 | Nowak et al. | |
| 2015/0081417 A1 | 3/2015 | Golden et al. | |
| 2015/0294377 A1 | 10/2015 | Chow | |
| 2015/0364057 A1 | 12/2015 | Catani et al. | |
| 2016/0055760 A1 | 2/2016 | Mirabile | |
| 2016/0171180 A1 | 6/2016 | Yagnyamurthy et al. | |
| 2016/0188821 A1 | 6/2016 | Ozeran | |
| 2016/0210427 A1 | 7/2016 | Mynhier et al. | |

FOREIGN PATENT DOCUMENTS

| | | |
|---|---|---|
| WO | 2008021704 A2 | 2/2008 |
| WO | 2009055385 A1 | 4/2009 |
| WO | 2012014161 A1 | 2/2012 |

OTHER PUBLICATIONS

IBM, Process for Deriving Aggregated Group Status Metrics from a Set of User Status Data, IP.com Prior Art Database Technical Disclosure, Apr. 2009, pp. 1-2, IPCOM000181443D, http://ip.com/IPCOM/000181443.

Disclosed Anonymously, Generating "Interesting" Social Incentives to Attract Traffic to Online Polls, IP.com Prior Art Database Technical Disclosure, Oct. 2010, pp. 1-5, IPCOM000200263D, http://ip.com/IPCOM/000200263.

Office Action dated Jun. 15, 2015 received in co-pending U.S. Appl. No. 14/136,694.

Office Action dated Oct. 19, 2015 received in U.S. Appl. No. 14/136,694.

Office Action dated Nov. 17, 2015 received in U.S. Appl. No. 14/185,359, pp. 1-31.

Chen, S., et al., "Collaborative Filtering with Fine-grained Trust Metric", IEEE Symposium on Computational Intelligence and Data Mining, CIDM '09, Mar. 30-Apr. 2, 2009, 8 pages.

Chen, W., "Social Network Collaborative Filtering Framework and Online Trust Factors: a Case Study on Facebook", 2010 Fifth International Conference on Digital Information Management (ICDIM), Jul. 2010, pp. 266-273.

Kim, Y.A., et al., "Modeling Trust in Online Social Networks to Improve Adolescent Health Behavior", Department of Computer Science and Engineering, University of Minnesota, Aug. 18, 2010, 53 pages.

Stumme, G., et al., "Semantic Web Mining: State of the art and future directions", Web Semantics and Agents on the World Wide Web Feb. 4, 2006, pp. 124-143.

Thilagam, P.S., "Applications of Social Network Analysis", Handbook of Social Network Technologies and Applications, Oct. 2010, pp. 637-649.

Office Action dated Sep. 7, 2016 received in U.S. Appl. No. 14/136,694, 25 pages.

Office Action dated May 27, 2016 received in U.S. Appl. No. 14/185,359, 21 pages.

Notice of Allowance dated Aug. 22, 2016 received in U.S. Appl. No. 14/185,359, 21 pages.

Office Action dated Feb. 2, 2017 received in U.S. Appl. No. 14/201,081, 50 pages.

Office Action dated Feb. 10, 2017 received in U.S. Appl. No. 14/136,694, 22 pages.

Office Action dated May 24, 2017 received in U.S. Appl. No. 14/201,081, 57 pages.

Office Action dated Sep. 20, 2017 received in U.S. Appl. No. 14/201,081, 56 pages.

Office Action dated Feb. 13, 2018 received in U.S. Appl. No. 14/201,081, 59 pages.

Office Action dated Sep. 22, 2016 received in U.S. Appl. No. 14/201,081, 72 pages.

Office Action dated Jul. 24, 2018 received in U.S. Appl. No. 14/201,081, 45 pages.

* cited by examiner

PERTURBATION, MONITORING, AND ADJUSTMENT OF AN INCENTIVE AMOUNT USING STATISTICALLY VALUABLE INDIVIDUAL INCENTIVE SENSITIVITY FOR IMPROVING SURVEY PARTICIPATION RATE

CROSS-REFERENCE TO RELATED APPLICATIONS

This application is related to U.S. patent application Ser. No. 14/185,359, now U.S. Pat. No. 9,524,505 entitled "END-TO-END EFFECTIVE CITIZEN ENGAGEMENT VIA ADVANCED ANALYTICS AND SENSOR-BASED PERSONAL ASSISTANT CAPABILITY (EECEASPA)," filed on Feb. 20, 2014, U.S. patent application Ser. No. 14/201,081 entitled "METHOD AND APPARATUS FOR EFFECTIVE ANALYZING THE ACCURACY/TRUSTWORTHINESS OF SURVEY ANSWERS THROUGH TRUST ANALYTICS," filed on Mar. 7, 2014, and U.S. patent application Ser. No. 14/136,694 entitled "A METHOD AND APPARATUS FOR IMPROVING SURVEY PARTICIPATION RATE WITH AN INCENTIVE MECHANISM," filed on Dec. 20, 2013, the entire content and disclosure of which are incorporated by reference herein in their entirety.

FIELD

The present application relates generally to computers, and computer applications, and more particularly to citizen engagement and analytics.

BACKGROUND

Different campaigns possess different characteristics (also known as campaign specifics), e.g., campaign criteria, requirements of recruitment and goals, which, if not addressed specifically or provided with appropriate amount of the incentives to the right participants, can often render the campaigns ineffective. For example, the campaigns may be unable to maximize the incentive resources or allocate the right incentive amount to motivate the participants to produce the intended level of responses and attract the appropriate types of people in the right geographic location, demographic group, e.g., age, education, income, to respond to the campaign for it to be successful.

BRIEF SUMMARY

A method of computing sensitivity in incentives provided for survey participation, in one aspect, may comprise identifying participants and one or more attributes associated with the participants. The method may also comprise clustering the participants into one or more clusters according to the one or more attributes. The method may further comprise perturbing an incentive to be given to a participant in a cluster of said one or more clusters by performing random perturbation computation, the perturbing performed with an objective to maximize campaign resources by optimizing an amount of the incentive distributed to each of the participants via modeling responsiveness of the cluster. The method may also comprise monitoring a change in one or more responses of the participant based on distributing of the incentive to the participant. The method may also comprise computing an individual incentive sensitivity of the participant based on the monitoring, the individual incentive sensitivity representing incentive sensitivity of responsiveness of the participant per incentive change.

A system of computing sensitivity in incentives provided for survey participation, in one aspect, may comprise a computer processor and an incentive response observer module operable to execute on the computer processor. The incentive response observer module may be further operable to receive identified participants clustered into one or more clusters by one or more attributes associated with the participants. The incentive response observer module may be further operable to perturb an incentive to be given to a participant in a cluster of said one or more clusters by performing random perturbation computation, the incentive response observer module further operable to monitor a change in one or more responses of the participant based on the incentive distributed to the participant. The incentive response observer module may be further operable to compute an individual incentive sensitivity of the participant based on monitoring the change. The incentive response observer module may be further operable to dynamically adjust an incentive amount based on the individual incentive sensitivity computed.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
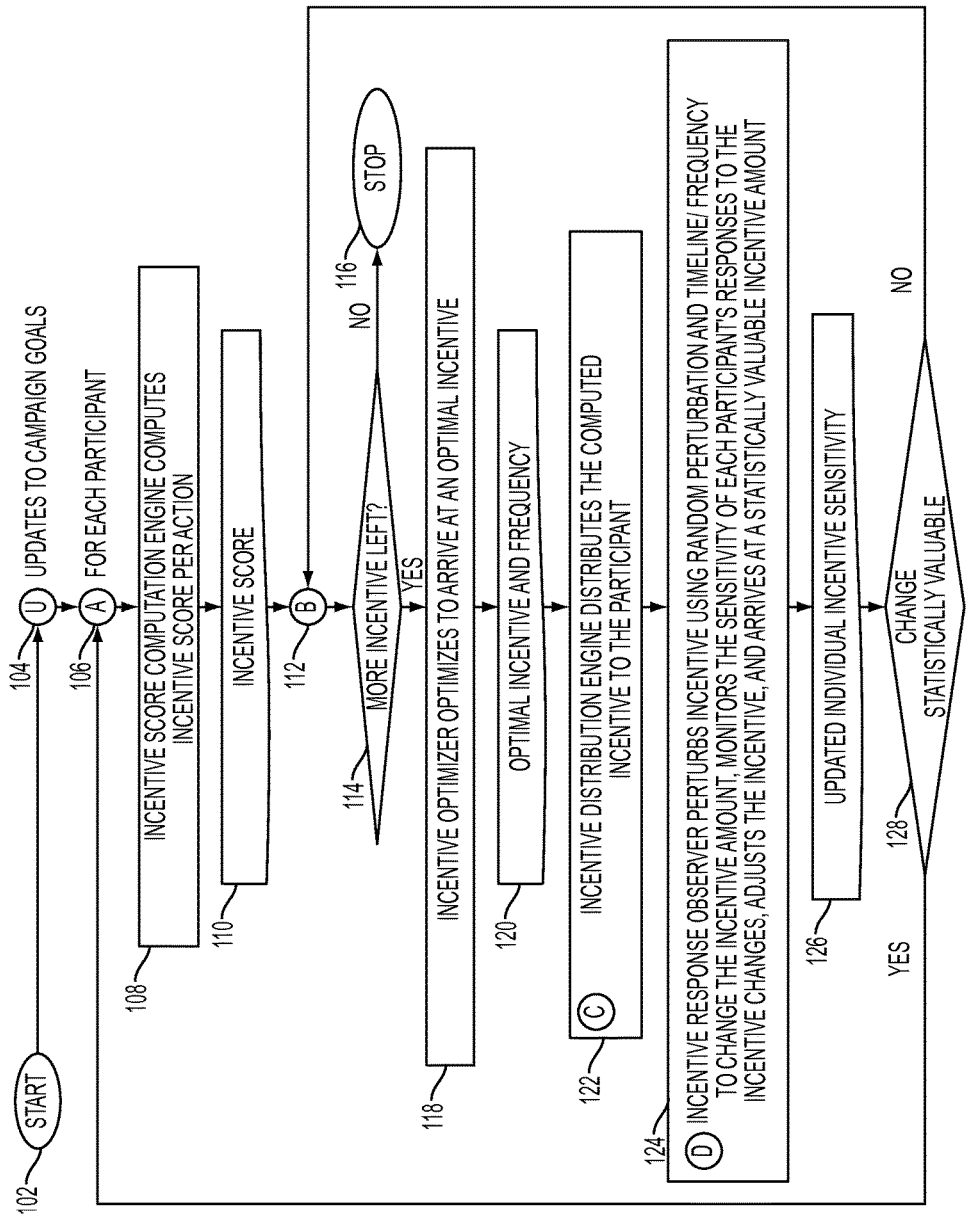
FIG. 1 is a flow diagram that illustrates an overall flow of incentive analytics in one embodiment of the present disclosure.

Adhoc management of campaigns lacks a systematic analysis on ways to perturb, monitor, and adjust an incentive amount based on an individual person's incentive sensitivity to the changes of incentive amount. Such systematic analysis needs to be statistically valuable, e.g., for use to optimize the allocation of the total incentive resources and to improve the survey participation rate.

Behavior objectives may be to measure sensitivity of participants in a sense of citizen engagement or campaign, and also applicable to other contexts, e.g., marketing, utility usage (e.g. water, electricity), carpooling, purchase of products or services, e.g., on remote platforms such as on a cloud or in the travel space such as hotel or airline loyalty program, and incentive design of retail stores, and others.

Citizen engagement or Campaign refers to city (or another organization) or citizen initiated activity that has a goal statement, timeline, and qualification for participation.

Campaign Definition may define a campaign (or engagement) specifying various attributes such a goal that is created, start and end dates, targeted demographic groups (e.g., age groups) of volunteers, targeted geographic areas, task for the volunteers to do (e.g., vote for a new park location), incentive definitions, rules to dynamically adjust incentives, and success metrics or measurement metrics, and/or others.

Campaign Announcement or Launch may include generating a campaign, e.g., a campaign Web page and automatically pushing announcement to social media channels, such as social networking channels, social micro-blogging and/or social blogging channels.

Campaign Recruitment (online) may enable citizens to register as campaigners and campaigners to update recruitment status; enable citizens to register as volunteers and perform the task they are recruited for, right there where they are registered; enable businesses (organizations or citizens) to register as sponsors; display campaign recruitment status for social approval.

Campaign Activity Reporting and Analysis may aggregate display of campaign progress of near real-time activity status for general public consumption and for use by the campaign administrators. Examples of the activity status may include viewed, liked, followed, response rate, most followed people, temporal statistics and advanced analytics for staff consumption, which enable near real-time monitoring of the progress of the campaign status and adjustments of incentive based on the response rate and coverage.

Sensor-based data refer to data collected using a variety of wireless (e.g., Bluetooth) sensing devices, e.g., Pulse oxy meter, Heart, beat monitor, Blood sugar monitor, Pedometer, etc.

The individual "incentive sensitivity" refers to the responsiveness of a person to the changes of the incentive amount, e.g., how a person responds to the amount of an incentive change, e.g., if monetary incentive is being offered, how a participant (also referred to as a volunteer) responds to changes in the monetary amount, e.g., $1, $5, to $10, and/or others.

The following illustrates some examples of campaign criteria or goals: Drive as many submissions as possible; Drive as many reliable (trustworthy, high quality, and/or accurate, etc.) submissions as possible; Drive as frequent submissions as possible; Provide more incentives to participants that meet certain attributes, e.g., location, demographics, financial status, etc. In another aspect, a campaign criterion need not have any preferences. Yet in another aspect, a campaign criteria may include measuring the effectiveness of a campaign, e.g., by computing delta (e.g., Effectiveness=Goals or Objectives−Current status).

In one aspect, a methodology of the present disclosure may be applied in various ways. For example, it may be used as an incentive perturbation mechanism to produce individualized incentive sensitivity for use to adjust incentive allocation accordingly and improve participation rate. This methodology or mechanism may involve the following functions or capabilities that can be used stand-alone of as part of other components to achieve an objective. The methodology may include clustering participants based on one or more of the attributes of the participants; computing the individual incentive sensitivity; randomly perturbing an incentive amount to arrive at statistically valuable incentive amount; monitoring and examining individual incentive sensitivity change (e.g., above a predetermined threshold) via clustered regression analysis of individual incentive sensitivity; dynamic adjustment of incentive allocation based on a participant's individual incentive sensitivity to the changes of the incentive amount.

In another aspect, a methodology of the present disclosure may be used in conjunction with an incentive computation, optimization and distribution mechanism (e.g., disclosed in U.S. patent application Ser. No. 14/136,694 to optimize the incentive allocation subject to the campaign goals and incentive resource constraints. This methodology may involve one or more of the following process that are iteratively performed as needed: computing an incentive score for use to distribute the incentive for each participant; optimizing the incentive resources and maximizing the campaign effectiveness subject to the campaign goals and incentive resource constraints using the incentive score; distributing the incentive to each participant based on the optimal amount and frequency; randomly perturbing an incentive amount to arrive at statistically valuable incentive amount; monitoring and examining individual incentive sensitivity change (e.g., above a predetermined threshold) via clustered regression analysis of individual incentive sensitivity; dynamically adjusting incentive allocation based on a participant's individual incentive sensitivity to the changes of the incentive amount.

FIG. 1 is a flow diagram that illustrates an overall flow of incentive analytics in one embodiment of the present disclosure. At 102, the analytics may begin. At 104, updates to one or more campaign goal may be received. At 106, based on the campaign goals, the processing shown in FIG. 1 may be performed. In one aspect, the processing at 108 to 122 may be performed for each participant. The processing at 124-128 may be performed for each participant with respect to a group of participants. For instance, the participants (e.g., by participant identifiers or other identifying information) in the target population may be obtained. The participants may have one or more attributes. One or more clusters of the participants may be created according to the one or more of the attributes of the participants, and the processing at 124-128 may apply to the one or more clusters.

The following describe examples of input to the processing beginning at 108: Primary attributes may include a user identifier (UID); Location+Timestamp (e.g., Latitude, Longitude, Time); Prior campaign responses including response frequency, response quality (e.g., accurate prior reporting, picture quality), other data quality, and campaign context; trust score to assign incentive score; and impact score to assign incentive score. A trust score and an impact score may be computed according to a methodology disclosed in U.S. patent application Ser. No. 14/201,081. Secondary attributes may include demographic information (e.g., age, occupation, education level, financial data, e.g., income, house ownership, mobility preferences such as public transit, bike, or cars, or others, skills, ownership of devices, e.g., smartphones, and appliances, and others; Social networking posting, e.g., textual input such as affirmative posting towards sustainability; Smarter meter and other natural resource data, e.g., water, electricity, gas, etc.; Other data provided by users, e.g., health risk assessment (HRA) related data, e.g., questionnaire responses, sensor-based data, e.g., smartphones, and others.

At 108, an incentive score per action may be computed for a participant, e.g., by a computation engine that may run on a computer or a computer processor. For example, equation (1) below may be used to compute this incentive score. Hence at 110, an incentive score is obtained. The computed incentive score is used below in determining an incentive or incentive amount to distribute to the participant.

At 112, the processing proceeds to 114. At 114, it is determined whether more incentive amount is left to be distributed. The left incentive amount is the difference between pre-allocated budget and allocated (distributed) incentive amount in 122 and 124. If there are no more incentives, the processing may stop at 116.

If, at 114, there are more incentives, an optimal incentive may be computed, e.g., by an incentive optimizer that may run on a computer or a computer processor. The incentive optimizer thus may produce an optimal incentive and frequency as shown at 120. The incentive optimizer may maximize the campaign effectiveness subject to the campaign goals and incentive resource constraints, e.g., by constructing an optimization problem in a mathematical formula and solving the optimization problem by selecting the most suitable optimizer to compute an optimal incentive amount and frequency of distribution to each participant.

At 122, the computed incentive may be distributed to the participant, e.g., by an incentive distribution engine that may run on a computer or a computer processor. For instance, an electronic coupon, discount, a gift may be distributed electronically over a computer network (e.g., the Internet) to the participant, e.g., via an email, web page post, or such another mechanism. In another aspect, the incentive may be distributed physically, e.g., by mail, courier, or another such mechanism.

At 124, the computed incentive may be perturbed, e.g., by an incentive response observer that may run on a computer or a computer processor, using random perturbation and timeline (or frequency) to change the incentive amount. For example, the computed incentive may be perturbed to maximize the campaign resources for optimizing the incentive amount to each participant by modeling the responsiveness of a participant (or a cluster of participants) using a regression analysis with at least three parameters: an incentive delta (change of the incentive amount paid to a participant), incentive frequency (distribution frequency or interval to a participant) and responsiveness delta (change of individual incentive sensitivity of a participant to the incentive delta and/or incentive frequency), to compute an individual incentive sensitivity for each participant. The individual incentive sensitivity may be measured according to a methodology shown in FIG. 3, 312 to 320 below. The sensitivity of each participant's response to the incentive changes may be monitored, e.g., the changes in frequency of responses of the participant may be observed to identify changes (e.g., above a threshold) in individual incentive sensitivity. For instance, the individual incentive sensitivity of responsiveness may be analyzed and calculated per incentive change, e.g., using statistical analysis, e.g., regression analysis (e.g., by a participant or by each cluster of participants). Thus, e.g., different incentives may be distributed over time and responses to those different distributions observed.

Statistical analysis, e.g., regression analysis helps to reduce the number of cycles needed to learn the sensitivity of similar participants. Therefore, it can reduce the turn-around time of the cycle, improve the right amount of the incentive per participant based on participant's response(s), and thus maximize the utility of incentive by distributing the right amount to the right participants. While each participant is unique, a cluster of similar participants with respect to attributes would have a similar sensitivity to particular changes in the incentive amount. For this, a randomly sampled population with a proper probability distribution would provide enough information to first create a parameterized sensitivity model per cluster and using that to infer each participant's sensitivity based on the varied parameter values, e.g., demographics, job type, location, etc.

If the sensitivity analysis is solely done through trial-and-error or a fixed amount of incentives to be distributed it could take considerable duration of time for each cycle and many cycles to obtain a statistical valuable (closer to accurate) amount of incentive for a participant to maximize the total budget based on participants' responses subject to the campaign goals, e.g., reliable responses, frequent responses, etc. because the sample set could be biased, which results in distributing most of the incentive value to participants for the purpose of sensitivity analysis. However, using statistical analysis, e.g., regression analysis, to analyze the individual incentive sensitivity by each cluster, can considerably reduce the cycle time in obtaining a statistical valuable (closer to accurate) amount of incentive.

Hence, at 126, individual incentive sensitivity that may be adjusted based on the computation from perturbation is obtained.

At 128, it is determined whether the change is statistically valuable. Various descriptive statistics can be used to quantify the statistically valuable change(s) such as sample variance, standard deviation, $1^{st}$ quartile, $3^{rd}$ quartile, the gap between median and mean value, and others. A predefined threshold can be set to determine if the change is statistically valuable. If it is determined that the change is statistically valuable, the logic of the methodology returns to 106, to recompute the incentive score based on the computed sensitivity and to repeat the processing. If at 128, the change is determined to be not statistically valuable, the logic of the methodology may return to 112 to perform optimization and perturbation and adjustment for another incentive to distribute subject to any incentive budget remaining.

Figure 2:
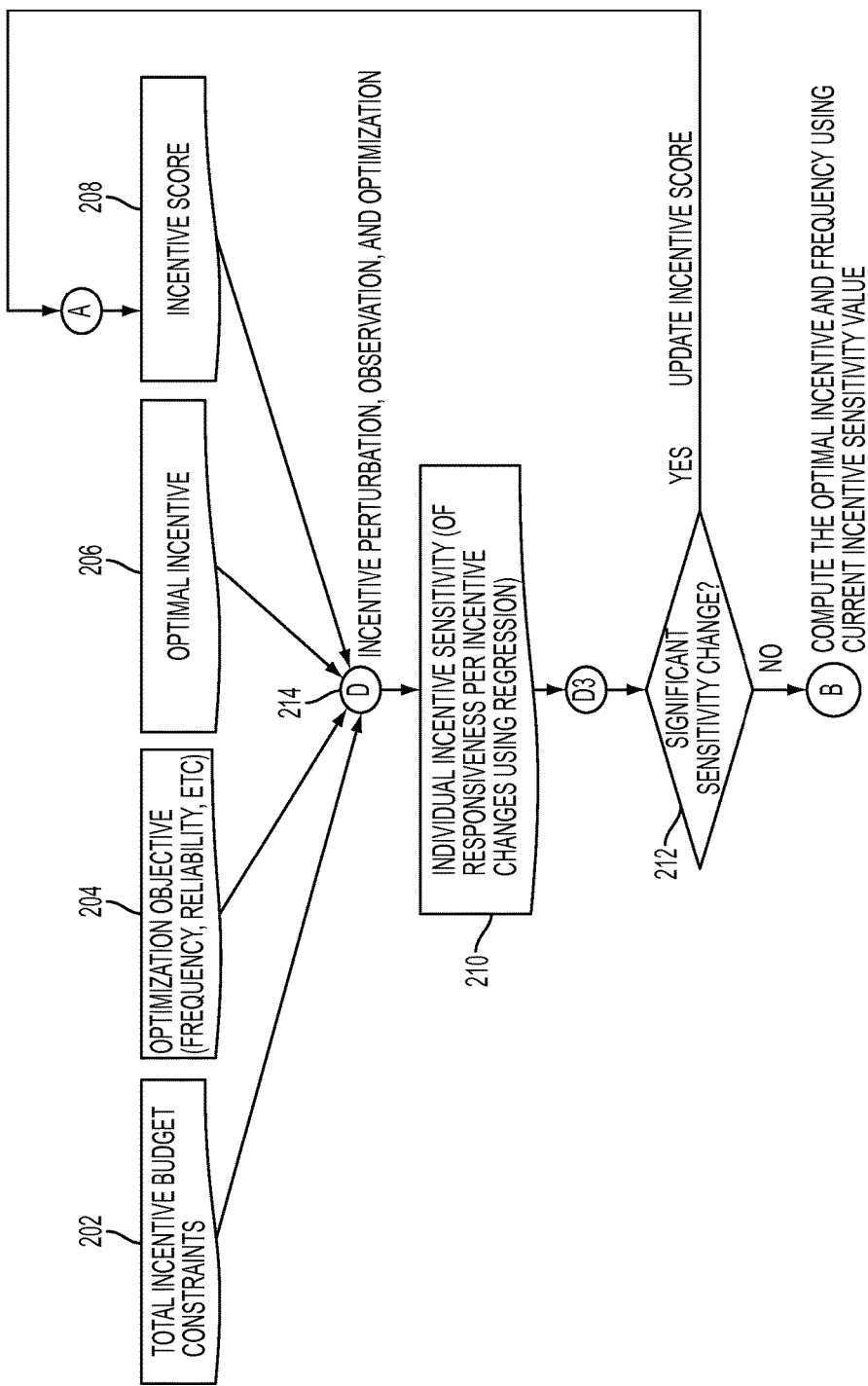
FIG. 2 is a flow diagram illustrating incentive score perturbation in one embodiment of the present disclosure.

FIG. 2 is a flow diagram illustrating incentive score perturbation in one embodiment of the present disclosure. Incentive perturbation, observation and optimization may be performed at 214 based on received input values of total incentive budget constraint(s) 202, optimization objective (e.g., frequency, reliability, and/or others) 204, an optimal incentive 206 and an incentive score 208. Optimal incentive 206, e.g., may have been computed based on Equation (4) below. Incentive score 208 may have been computed based on Equation (1) below. The computation at 214 may use regression to produce an individual incentive sensitivity of responsiveness per incentive change 210. At 212, it is determined whether a significant sensitivity change is detected. The significance of change may be determined based on a criterion or a threshold; For instance, if the sensitivity change exceeds a predetermined threshold or meets another criterion, the change may be determined as being significant. If the change is determined to be significant, the logic proceeds to recomputed the incentive score, to use as an input in the next iteration. On the other hand, if at 212 the sensitivity change is determined to be not significant, the logic proceeds to compute the optimal incentive (e.g., using Equation (4)) and frequency using current individual incentive sensitivity value.

Figure 3:
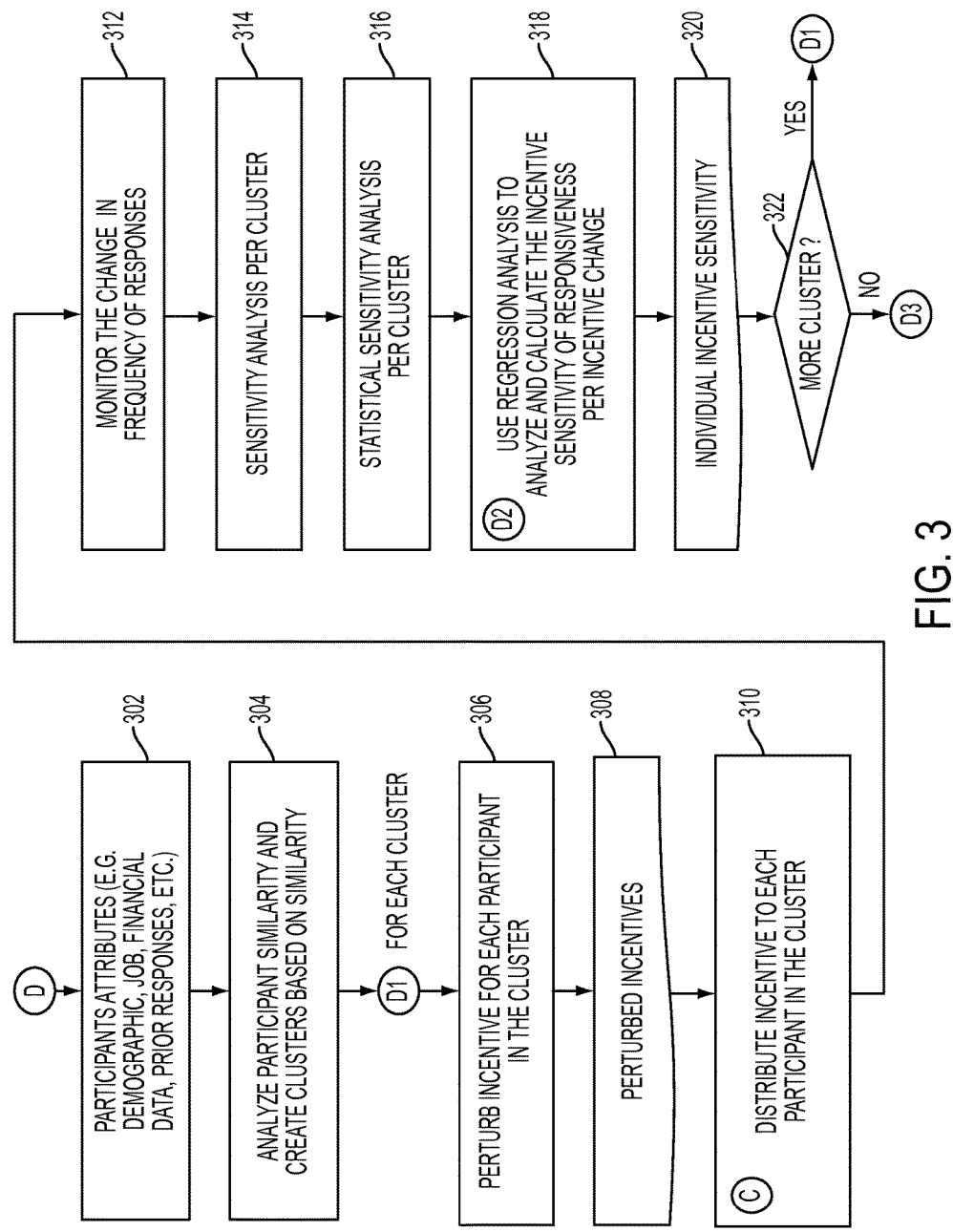
FIG. 3 is a flow diagram illustrating a calculation of individual incentive sensitivity in one embodiment of the present disclosure.

FIG. 3 is a flow diagram illustrating a calculation of individual incentive sensitivity in one embodiment of the present disclosure, e.g., performed at 214 in FIG. 2.

At 302, participants' attributes are obtained or received. At 304, participant similarity is analyzed and a cluster of participants is created based on the analyzed similarity. For instance, participants having similar attributes may be grouped (e.g., have the same age range, live or work in the same geographic area, have responded to prior surveys at least X number of times, and/or other attributes).

At 306, for each cluster, incentive is perturbed for each participant in the cluster. For example, subject to the total incentive constraints, an incentive response observer or the like that may run on a computer or computer processor may use random perturbation and timeline (frequency) to change the incentive amount and adjusts the incentive amount based on individual sensitivity to the incentive changes. For instance, Equation (3) below may be employed for this perturbation. For instance, the current incentive may be increased or decreased by a "random amount" within the budget constraint. Likewise, the frequency of incentive distribution may be randomly perturbed or changed. Such random number and random interval in perturbation can reach the statistically valuable number faster and more accurately than using a "fixed amount" or a fixed period and/or evenly distributed intervals via the use of statistical analysis, e.g., regression analysis.

At 308, the perturbed incentives are obtained for each participant in the cluster. At 310, the perturbed incentive is distributed to the participants in the cluster, e.g., to each participant in the cluster.

At 312, the changes, if any, in the frequency of responses from the participants are monitored. For instance, each participant's response or individual sensitivity to the incentive changes may be monitored. If the response is positive toward the campaign goals (e.g., participants increase the frequencies and/or accuracy of responses), the same amount of incentive may be delivered until reaching statistically valuable incentive number.

Figure 4:
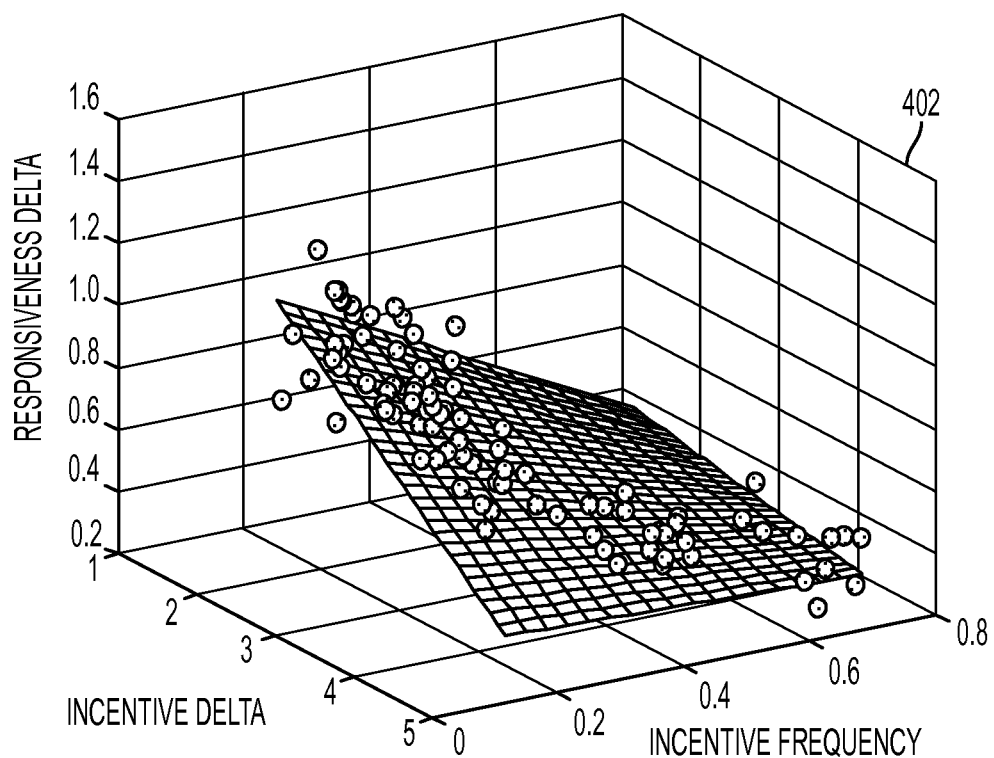
FIG. 4 is a graphical plot that shows a sample output of regression analysis in one embodiment of the present disclosure.

A regression analysis is a standard technique where an underlying dynamics of a sample population can be described with a few parameters of a given model. For example, as shown in FIG. 4, 402, a sensitivity of a group of people (participants) can be described by three variables such as Incentive Frequency, Incentive Delta, and Responsiveness Delta where a model in 402 is a plane in a Cartesian coordinate system. While the measured behavior of the group differs (shown with dots), it can be parameterized using two major variables; a normal vector and an offset. Several statistical measures can be identified using the distance measure between the regression model with parameters and measured points.

If response is negative with respect to the campaign goals (e.g., decrease in participation or inaccurate responses), the base incentive may be used and the random perturbation started again, until participants' responses turn positive, keeping the incentive perturbation within the incentive budget.

At 314, sensitivity analysis may be performed per cluster. This may involve or use the following steps: (a) a clustering of participants by chosen attributes (e.g., shown at 304), (b) running a regression model of observed behavior to create a parameterized incentive sensitivity model for the cluster (e.g., shown at 318), and (c) extracting parameters of regression model 318. The parameters (with values varied per each participant) are used to plug into the cluster-based incentive sensitivity model (shown at 318) to calculate individual incentive sensitivity of each participant (shown at 320).

At 316, statistical sensitivity analysis per cluster may be performed. The descriptive statistics described above with reference to FIG. 1 at 128 is compared to determine if there is any change that is above the pre-defined threshold.

At 318, regression analysis may be performed to analyze and calculate an individual incentive sensitivity of responsiveness per incentive change per cluster per participant. Hence, at 320, individual incentive sensitivity is obtained. That is, e.g., the incentive sensitivity model analyzed for a cluster at 318 is used to calculate an individual incentive sensitivity of each participant based on varied parameters in the same cluster 320. Once the individual incentive sensitivity is obtained at 320, it is used to calculate an individual sensitivity score (108 and 110), which is then fed into the incentive optimizer 118 to calculate incentive amount for each individual 120.

At 322, if there are more clusters of participants, the processing logic proceeds to 306. If there are no more clusters of participants, the processing logic may proceed to determine whether there is a sensitivity change that is considered to be significant and if so to update the incentive, e.g., as shown at 212 in FIG. 2. For example, the individual incentive sensitivity that is obtained at 320 (and that is determined to significantly different from the previously computed individual incentive sensitivity), may be used to recompute or update an incentive score, which in turn is used to compute an incentive (e.g., amount of incentive). In this way, an incentive (e.g., incentive amount) may be dynamically adjusted based on individual incentive sensitivity by triggering the re-computation or update of an incentive score (e.g., if it is determined that there is a significant change in individual incentive sensitivity). Whether the change is significant may be determined based on the amount of change exceeding a predetermined threshold.

FIG. 4 is a graphical plot that shows a sample output of regression analysis in one embodiment of the present disclosure, which for example is used at 318 in FIG. 3. The graph 402 shows regression on individual incentive sensitivity of similar individuals, i.e., cluster of participants grouped by similarity in their attributes. The regression uses at least three parameters: incentive delta, incentive frequency, and responsiveness delta. Incentive delta refers to change is the incentive, e.g., by amount or type or another factor. Incentive frequency refers to how often an incentive is offered. Responsiveness delta refers to the change in participant's responsiveness resulting from change in one or more of the incentive or incentive frequency. Individual's incentive sensitivity using regression analysis produces a statistically valuable amount for use to detect any significant change in the individual's incentive sensitivity. Incentive amount may be adjusted (either positive or negative) accordingly.

Equation (1) is an example formulation that computes and incentive score per participant.

$$Score^I = S^I \sum_{i \in \Gamma} W(i)M(i) \qquad (1)$$

Where
I represents an individual identifier (ID) uniquely identifying a participant.
$Score^I$ represents Incentive Score for the ID (with an initial default value)
$S^I$ represents sensitivity for the ID,
W(i) represents weight for the ID,
M(i) represents default score used for the ID,
and Γ represents a chosen set of attributes and metrics,
Initial M(i)s and W(i) may be predefined and S(i) re-fed by sensitivity score calculation.

Equation (2) shown incentive computation in one embodiment of the present disclosure, for example, based on which a distribution to a participant may be made (e.g., FIG. 1 at 122, FIG. 3 at 310).

$$Incentive^I = B \frac{Score^I}{\sum_{I \in \Lambda} Score^I} \quad (2)$$

Where

I represents an individual identifier (ID) uniquely identifying a participant $Score^I$ represents Incentive Score for the ID $\Lambda$ total participant pool B total budget Equation (3) is an example formulation that computes incentive score perturbation, which in turn provides perturbation in incentive computed in Equation (2) (e.g., FIG. 1 at 124, FIG. 2 at 214, FIG. 3 at 306).

$$Score_{ptd}^I = Score^I + \varepsilon_j \quad (3)$$

Where, $Score_{ptd}^I$: ptd represents a perturbed incentive score for the ID

I represents an individual identifier (ID) uniquely identifying a participant $Score^I$ represents incentive score for the ID $\varepsilon_j$ is a random variable Equation (4) is an example formulation that optimizes the incentive, e.g., which may be used in FIG. 1 at 118.

$$\begin{aligned} \text{minimize} \quad & \sum_{I \in \Lambda} Incentive^I \\ \text{subject to} \quad & Incentive^I = B \frac{Score^I}{\sum_{I \in \Lambda} Score^I} \\ & Score^I = f^I(A) \\ & \sum_{I \in \Lambda} Incentive^I \leq B \end{aligned} \quad (4)$$

where

I represents an individual identifier (ID) uniquely identifying a participant $Score^I$ represents Incentive Score for the ID $\Lambda$ total participant pool B total budget $f^I(A)$ represents a function for I with a chosen vector of attributes $A = [a_i]$ The computation of Equation (4) may be performed by the incentive optimizer to obtain an optimal incentive amount for each participant subject to the total incentive amount.

Figure 5:
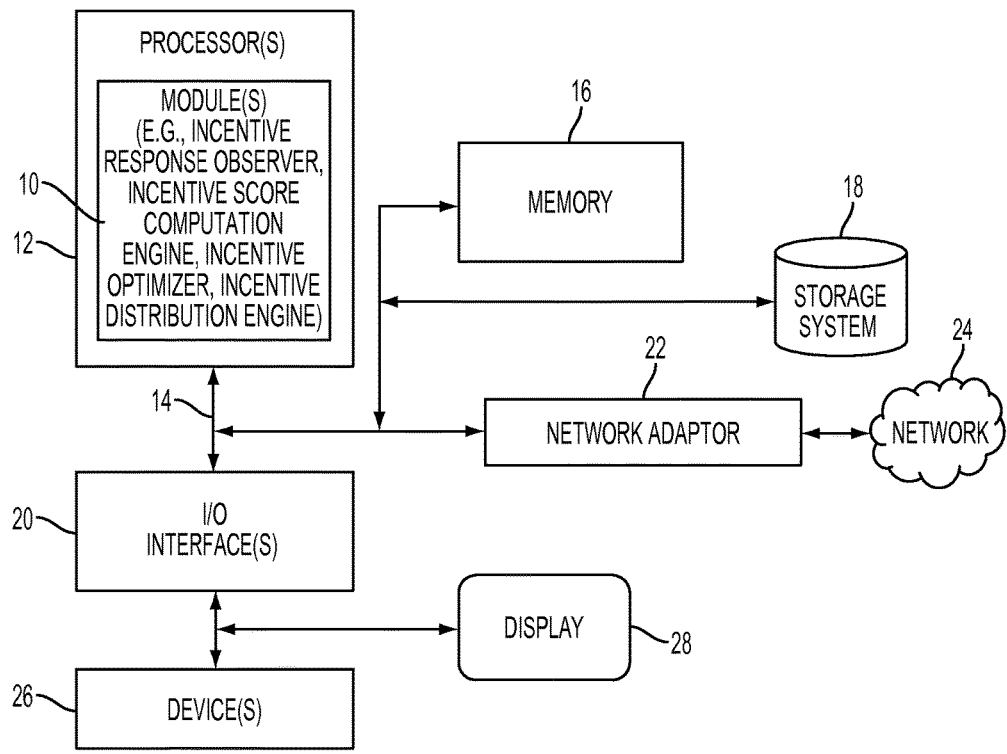
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 10 that perform the methods described herein. The one or more modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method comprising:
   calculating, by a processor, an incentive score per action for a participant;
   determining an incentive amount based on an incentive score;
   in response to determining that there are more incentives left to be distributed, calculating, by the processor, an optimal incentive and optimal frequency of the optimal incentive;
   distributing, by the processor, the optimal incentive to the participant through a network;
   modifying, by the processor, the optimal incentive by modeling responsiveness of the participant using a regression analysis with at least three parameters comprising an incentive delta, incentive frequency and responsiveness delta;
   calculating, by the processor, an individual incentive sensitivity for the participant;
   adjusting, by the processor, the individual incentive sensitivity based on the modifying;
   determining, by the processor, whether a change between the individual incentive sensitivity and the adjusted individual incentive sensitivity is statistically valuable,
   wherein the modeling responsiveness of the participant using a regression analysis reduces processor cycle time in obtaining the incentive amount that is more accurate.

2. The method of claim 1, wherein the incentive delta represents a change of the incentive amount distributed to the participant.

3. The method of claim 1, wherein the incentive frequency represents distribution frequency to the participant.

4. The method of claim 1, wherein the incentive frequency represents distribution interval to the participant.

5. The method of claim 1, wherein the responsiveness delta represents a change of the individual incentive sensitivity of the participant to the incentive delta.

6. The method of claim 1, wherein the responsiveness delta represents a change of the individual incentive sensitivity of the participant to the incentive frequency.

7. The method of claim 1, wherein the responsiveness delta represents a change of the individual incentive sensitivity of the participant to the incentive delta and a change of the individual incentive sensitivity of the participant to the incentive frequency.

8. A system comprising:
   a memory device; and
   a hardware processor coupled with the memory device, the hardware processor performing:
   calculating an incentive score per action for a participant;
   determining an incentive amount based on an incentive score;
   in response to determining that there are more incentives left to be distributed,
   calculating an optimal incentive and optimal frequency of the optimal incentive;

distributing the optimal incentive to the participant through a network;

modifying the optimal incentive by modeling responsiveness of the participant using a regression analysis with at least three parameters comprising an incentive delta, incentive frequency and responsiveness delta;

calculating an individual incentive sensitivity for the participant;

adjusting the individual incentive sensitivity based on the modifying;

determining whether a change between the individual incentive sensitivity and the adjusted individual incentive sensitivity is statistically valuable, wherein the modeling responsiveness of the participant using a regression analysis reduces hardware processor cycle time in obtaining the incentive amount that is more accurate.

9. The system of claim 8, wherein the incentive delta represents a change of the incentive amount distributed to the participant.

10. The system of claim 8, wherein the incentive frequency represents distribution frequency to the participant.

11. The system of claim 8, wherein the incentive frequency represents distribution interval to the participant.

12. The system of claim 8, wherein the responsiveness delta represents a change of the individual incentive sensitivity of the participant to the incentive delta.

13. The system of claim 8, wherein the responsiveness delta represents a change of the individual incentive sensitivity of the participant to the incentive frequency.

14. The system of claim 8, wherein the responsiveness delta represents a change of the individual incentive sensitivity of the participant to the incentive delta and a change of the individual incentive sensitivity of the participant to the incentive frequency.

15. A non-transitory computer readable storage medium storing a program of instructions executable by a machine to perform a method comprising:

calculating an incentive score per action for a participant;

determining an incentive amount based on an incentive score;

in response to determining that there are more incentives left to be distributed, calculating an optimal incentive and optimal frequency of the optimal incentive;

distributing the optimal incentive to the participant through a network;

modifying the optimal incentive by modeling responsiveness of the participant using a regression analysis with at least three parameters comprising an incentive delta, incentive frequency and responsiveness delta;

calculating an individual incentive sensitivity for the participant;

adjusting the individual incentive sensitivity based on the modifying;

determining whether a change between the individual incentive sensitivity and the adjusted individual incentive sensitivity is statistically valuable, wherein the modeling responsiveness of the participant using a regression analysis reduces hardware processor cycle time in obtaining the incentive amount that is more accurate.

16. The non-transitory computer readable storage medium of claim 15, wherein the incentive delta represents a change of the incentive amount distributed to the participant.

17. The non-transitory computer readable storage medium of claim 15, wherein the incentive frequency represents distribution frequency to the participant.

18. The non-transitory computer readable storage medium of claim 15, wherein the incentive frequency represents distribution interval to the participant.

19. The non-transitory computer readable storage medium of claim 15, wherein the responsiveness delta represents a change of the individual incentive sensitivity of the participant to the incentive delta.

20. The non-transitory computer readable storage medium of claim 15, wherein the responsiveness delta represents a change of the individual incentive sensitivity of the participant to the incentive frequency.

* * * * *